(12) United States Patent
Lai et al.

(10) Patent No.: US 11,190,090 B1
(45) Date of Patent: Nov. 30, 2021

(54) APPARATUS FOR AUTOMATED ENCAPSULATION OF MOTOR ROTOR CORE WITH MAGNET STEEL

(71) Applicant: GALLANT MICRO. MACHINING CO., LTD., New Taipei (TW)

(72) Inventors: Hung-Neng Lai, New Taipei (TW); Mu-Ching Chang, New Taipei (TW); Chih-Yuan Chiang, New Taipei (TW); Chih-Hung Hsu, New Taipei (TW); Chun-Chiang Ding, New Taipei (TW)

(73) Assignee: GALLANT MICRO. MACHINING CO., LTD., New Taipei (TW)

( * ) Notice: Subject to any disclaimer, the term of this patent is extended or adjusted under 35 U.S.C. 154(b) by 82 days.

(21) Appl. No.: 16/881,019

(22) Filed: May 22, 2020

(51) Int. Cl.
| | |
|---|---|
| H02K 15/12 | (2006.01) |
| H02K 15/03 | (2006.01) |
| B29C 43/34 | (2006.01) |
| H02K 1/27 | (2006.01) |
| H02K 1/28 | (2006.01) |
| B29C 43/00 | (2006.01) |
| B29C 43/18 | (2006.01) |
| B29C 43/58 | (2006.01) |
| B29L 31/00 | (2006.01) |
| B29K 705/12 | (2006.01) |

(52) U.S. Cl.
CPC ........... *H02K 15/12* (2013.01); *B29C 43/006* (2013.01); *B29C 43/18* (2013.01); *B29C 43/34* (2013.01); *B29C 43/58* (2013.01); *H02K 1/276* (2013.01); *H02K 1/28* (2013.01); *H02K 15/03* (2013.01); *B29C 2043/181* (2013.01); *B29C 2043/5875* (2013.01); *B29K 2705/12* (2013.01); *B29K 2995/0008* (2013.01); *B29L 2031/7498* (2013.01)

(58) Field of Classification Search
CPC ........ H02K 15/12; H02K 15/03; B29C 43/34; B29C 2043/181; B29C 2043/5875
See application file for complete search history.

(56) References Cited

U.S. PATENT DOCUMENTS

| | | | | |
|---|---|---|---|---|
| 2012/0324719 A1* | 12/2012 | Sasaki | ..................... | B29C 39/10 29/598 |
| 2013/0298384 A1* | 11/2013 | Kato | ..................... | H02K 15/03 29/598 |
| 2018/0076700 A1* | 3/2018 | Nagai | .................... | H02K 15/03 |

(Continued)

*Primary Examiner* — Robert B Davis

(57) ABSTRACT

An apparatus for automated encapsulation of motor rotor core with magnet steel is introduced. The apparatus includes at least one encapsulation unit, a plastic granule feeding device, a waste removing device, a conveyance device and a control device. Under a coordinated control of the control device, a rotor core feeding mechanism of the encapsulation unit feeds rotor cores to a plastic dispensing mechanism in cycles, the plastic granule feeding device separates, outputs and dispenses plastic granules, so that they are arrayed before being dispensed onto the rotor cores, and the conveyance device conveys plastic granules and moves the waste removing device to carry waste to a waste removal zone. With these arrangements, it is able to realize automated feeding of rotor cores, automated feeding of plastic granules and automated removal of waste to achieve completely automated rotor core encapsulation operation while enables mass production of motor rotor cores.

10 Claims, 16 Drawing Sheets

(56) References Cited

U.S. PATENT DOCUMENTS

| | | | |
|---|---|---|---|
| 2019/0089231 A1* | 3/2019 | Ishimatsu | H02K 11/35 |
| 2019/0229596 A1* | 7/2019 | Broadbridge | H02K 9/22 |
| 2019/0363621 A1* | 11/2019 | Myojin | H02K 15/0043 |
| 2020/0317496 A1* | 10/2020 | Lai | B67D 1/08 |

* cited by examiner

APPARATUS FOR AUTOMATED ENCAPSULATION OF MOTOR ROTOR CORE WITH MAGNET STEEL

BACKGROUND OF THE INVENTION

1. Field of the Invention

The present disclosure relates to a motor rotor core producing apparatus, and in particular to an apparatus for automated encapsulation of motor rotor core with magnet steel.

2. Description of the Related Art

It is a main tendency to demand for motor rotors that have high output-capacity and are environment-resistant to withstand high speed rotation in, for example, an extremely high or low temperature, oily or corrosive environment. In this case, the laminated rotor core assembly for the motor and how firmly the magnet steel is bonded on the rotor core would have a direct influence on the output performance, quality and lifespan of the motor.

Currently, a motor rotor core and magnet steel encapsulation machine is used to encapsulate the rotor core and the magnet steel generally in three manners. The first manner is spot gluing, in which the magnet steel is first filled in a magnet steel cavity on the rotor core and then, spots of a liquid-state filling thermosetting plastic are dispensed on and around the magnet steel and the liquid thermosetting plastic is allowed to flow into the magnet steel cavity automatically. The second manner is magnet steel immersing, in which an adhesive tape is first attached to a bottom of the rotor core and then, an adequate amount of liquid-state thermosetting plastic is introduced into the magnet steel cavity before the magnet steel is put thereinto. The third manner is single plastic granule dispensing, in which the rotor core is first orderly arranged and the magnet steel is positioned in the magnet steel cavity and a large-size single plastic granule is heated to melt, and then the molten plastic is forced into the magnet steel cavity to fill up the gaps between the magnet steel cavity and the magnet steel.

From a comparison among the above three encapsulation manners, it is found the first and second manners are only suitable for use with a single-layer rotor core and must use liquid-state filling plastic, and require a lot of manual operation. In other words, the first and the second manner do not meet the conditions for automated production of laminated rotor cores and tend to cause incompact encapsulation of rotors because no pressure is applied during the glue filling process. The third manner can be applied to the production of laminated rotor cores, but the single plastic granule used in the process is quite large in volume and not easily evenly heated. Other disadvantages of the third manner include the requirement for a relative long runner for filling the molten plastic because only one single plastic feeding source is used, the low practical utilization of plastic granule, and the high cost of plastic material. In brief, all the above three encapsulation manners fail to realize the mass production of high-quality and high-capacity motor rotors.

Meanwhile, the currently available encapsulation machines usually adopt top pouring in encapsulation the motor rotor cores. With this method, it is uneasy to stably separate waste from the plastic material previously introduced into and then molded in the magnet steel cavity, and therefore causes difficulty in de-molding. After de-molding, the separated waste directly falls under the force of gravity without being correctly caught and collected. Therefore, the plastic dispensing devices for the currently available motor rotor core encapsulation machines can only realize the automation of the plastic dispensing, but not the automation of the whole encapsulation line, including the automation of continuous rotor core feeding, the feeding of plastic granules, and the collecting of waste.

BRIEF SUMMARY OF THE INVENTION

An objective of the present disclosure is to provide an apparatus for automated encapsulation of motor rotor core with magnet steel, so as to solve the problems in the conventional motor rotor core producing apparatus.

To achieve at least the above objective, the apparatus for automated encapsulation of motor rotor core with magnet steel according to the present disclosure includes at least one encapsulation unit, a plastic granule feeding device, a waste removing device, a conveyance device, and a control device. The encapsulation unit each includes a plastic dispensing mechanism and a rotor core feeding mechanism; the rotor core feeding mechanism is located to one side of the plastic dispensing mechanism for feeding a plurality of rotor cores to the plastic dispensing mechanism one by one. The plastic granule feeding device includes a plastic granule storing member, a plastic granule conveyance tube, a transport member and a transfer plate; the transport member is connected to the plastic granule conveyance tube, which has an inlet communicable with the plastic granule storing member and an outlet facing toward a top surface of the transfer plate; the transfer plate has a plurality of granule holding cavities formed at locations corresponding to the rotor core; and the transfer plate is provided at a bottom with a control valve for opening and closing a bottom of each of the granule holding cavities. The conveyance device includes a conveyance rail, a first conveyance mechanism and a second conveyance mechanism; the conveyance rail extends in parallel to a straight line connecting the plastic dispensing mechanism, the plastic granule feeding device and a waste removal zone; the first conveyance mechanism is connected to the transfer plate, allowing the transfer plate to slide on the conveyance rail; and the second conveyance mechanism is connected to the waste removing device, allowing the waste removing device to slide on the conveyance rail. The control device is connected to the plastic dispensing mechanism, the rotor core feeding mechanism, the transport member, the control valve, the waste removing device, the first conveyance mechanism, and the second conveyance mechanism through signals. The control device controls the rotor core feeding mechanism for the rotor cores to be sequentially fed to and removed from the plastic dispensing mechanism; controls the transport member for the plastic granule conveyance tube to move on a top of the transfer plate and dispense plastic granules into the granule holding cavities; controls the first conveyance mechanism to move the transfer plate, so that the transfer plate moves reciprocatingly between a position corresponding to the plastic granule storing member and another position corresponding to the plastic dispensing mechanism; controls the control valve to open the granule holding cavities when the transfer plate is located at the position corresponding to the plastic dispensing mechanism, so that the plastic granules in the granule holding cavities are fed to the plastic dispensing mechanism; and on the other hand, controls the control valve to close the granule holding cavities when the transfer plate is located at the position corresponding to plastic granule storing member; controls the plastic dispensing mechanism to dispense plastic onto the rotor cores; controls the second conveyance mechanism to move the waste removing device, so that the waste removing device moves reciprocatingly between a position corresponding to the waste removal zone and another position corresponding to the plastic dispensing mechanism; controls the waste removing device to remove waste from the plastic dispensing mechanism when the waste removing device is located at the position corresponding to the plastic dispensing mechanism; and controls the waste removing device to release the waste therefrom when the waste removing device is located at the position corresponding to the waste removal zone.

In an embodiment, the rotor core feeding mechanism includes a rotary shaft, a power-output device and a rotor core platform. The rotary shaft is located to one side of the plastic dispensing mechanism, and the rotor core platform has a central area fitted on around the rotary shaft for carrying a plurality of plastic dispensing plates thereon. Each of the plastic dispensing plates has a receiving zone for receiving one rotor core therein. The power-output device is connected to the rotor core platform for the rotor core platform to rotate, so that the plastic dispensing plates are sequentially fed to the plastic dispensing mechanism.

In an embodiment, the control device is connected to the power-output device through signals and controls the power-output device for the plastic dispensing plates to be sequentially fed to and removed from the plastic dispensing mechanism.

In an embodiment, the rotor core feeding mechanism includes two conveyance tracks located at a rotor core inlet and a rotor core outlet, respectively, of the plastic dispensing mechanism.

In an embodiment, the control device is connected to the conveyance tracks through signals for the rotor cores to be fed to and removed from the plastic dispensing mechanism sequentially.

In an embodiment, the transfer plate is provided near the granule holding cavities with a plurality of heating elements.

In an embodiment, the apparatus further includes an inserting and expanding device, which includes an outer sleeve, an inner sleeve, an insertion shaft, a powered pressing element and a powered restoring element. The inner sleeve is in the form of an upward tapered cone, which is connected at its lower end to a plastic dispensing plate of the rotor core feeding mechanism. The outer sleeve internally defines a conical space for fitting around the inner sleeve, and has its outer surface facing toward an inner surface of a shaft hole of the rotor core. The outer sleeve is provided with a plurality of upper slits that are axially downward extended from an upper end of the outer sleeve by a predetermined length, and a plurality of lower slits that are axially upward extended from a lower end of the outer sleeve by a predetermined length. The upper slits and the lower slits are circumferentially equally spaced and located in a staggered arrangement; and a receiving space and an anti-detachment section are formed atop the outer sleeve. The insertion shaft includes a head portion and a body portion; the body portion axially extending through the inner sleeve and the head portion is set in the receiving space. The anti-detachment section is abutted against the head portion along the head portion's top edge; the receiving space and the anti-detachment section work together to restrict the insertion shaft from moving relative to the outer and the inner sleeve. The powered pressing element is located in the vicinity of the head portion of the insertion shaft, and the powered restoring element is located in the vicinity of the lower end of the inner sleeve; and the powered pressing element and the powered restoring element are connected to the control device through signals. The control device controls the powered pressing element to press against the head portion in an axial direction of the insertion shaft, so that the outer sleeve is subjected to a downward pressing force to become outward expanded; and the control device is also able to control the powered restoring element to upward press against the body portion in a reverse axial direction of the insertion shaft, so that the outer sleeve restores to its original position and shape.

In an embodiment, the rotor core feeding mechanism further includes a thermal insulation device, which includes an elevating arm, an insulation hood and a bottom heating plate. The elevating arm is connected to the insulation hood, and the bottom heating plate is located below the insulation hood. The control device is connected to the elevating arm through signals to control the elevating arm to move vertically.

In an embodiment, the rotor core feeding mechanism further includes an outer-diameter limiting device, which includes a movable arm and two half-circular retaining frames shaped corresponding to the rotor core. The movable arm is connected to the control device through signals for driving the two half-circular retaining frames to move onto a plastic dispensing plate of the rotor core feeding mechanism; and the two half-circular retaining frames respectively include a fastening section, which can be tightened to one another.

In an embodiment, the apparatus comprises a plurality of parallelly arranged encapsulation units, and the conveyance rail is common for use by all the encapsulation units. And, the plastic granule feeding device and the waste removal zone are located at two outermost ends of the parallelly arranged encapsulation units.

With the above arrangements of the apparatus for automated encapsulation of motor rotor core with magnet steel according to the present disclosure, the rotor core feeding mechanism can be driven to operate and feed the rotor cores to the plastic dispensing mechanism in cycles under a coordinated control of the control device. Meanwhile, the plastic granule storing member is vibrated to separate the plastic granules before they are output via the plastic granule conveyance tube for dispensing into corresponding granule holding cavities and stored therein temporarily. In this step, small-sized plastic granules are used to enable pre-arrayed plastic granules and avoid the problems in using large-sized plastic granules, such as long preheating time, uneven filling quality, low practical utilization of plastic granules, etc., and can therefore, effectively reduce the cost of using plastic granules. The transfer plate is moved by the first conveyance mechanism to above the plastic dispensing mechanism, and the control valve can be selectively set to an open position or a closed position for filling of the plastic granules into the plastic dispensing mechanism under control. After the plastic dispensing is completed, the waste removing device is moved by the second conveyance mechanism to transport waste to the waste removal zone, while the rotor core that has been encapsulated is moved away from the plastic dispensing mechanism by the rotor core feeding mechanism. Therefore, automated removal of waste is realized.

The apparatus of the present disclosure enables automated feeding of rotor cores, automated feeding of plastic granules and automated removal of waste to achieve an overall automated encapsulation of the motor rotor core with magnet steel, which in turn enables automated mass production of rotor cores. The apparatus of the present disclosure enables automated plastic dispensing onto laminated iron core to thereby ensure secured assembly of the laminated iron core and firm bonding of the magnet steel to the rotor core, which in turn gives the motor rotors upgraded quality and performance.

DETAILED DESCRIPTION OF THE INVENTION

To facilitate understanding of the objects, characteristics and effects of this present disclosure, embodiments together with the attached drawings for the detailed description of the present disclosure are provided. It is noted the present disclosure can be implemented or applied in other embodiments, and many changes and modifications in the described embodiments can be carried out without departing from the spirit of the disclosure, and it is also understood that the preferred embodiments are only illustrative and not intended to limit the present disclosure in any way.

Figure 1:
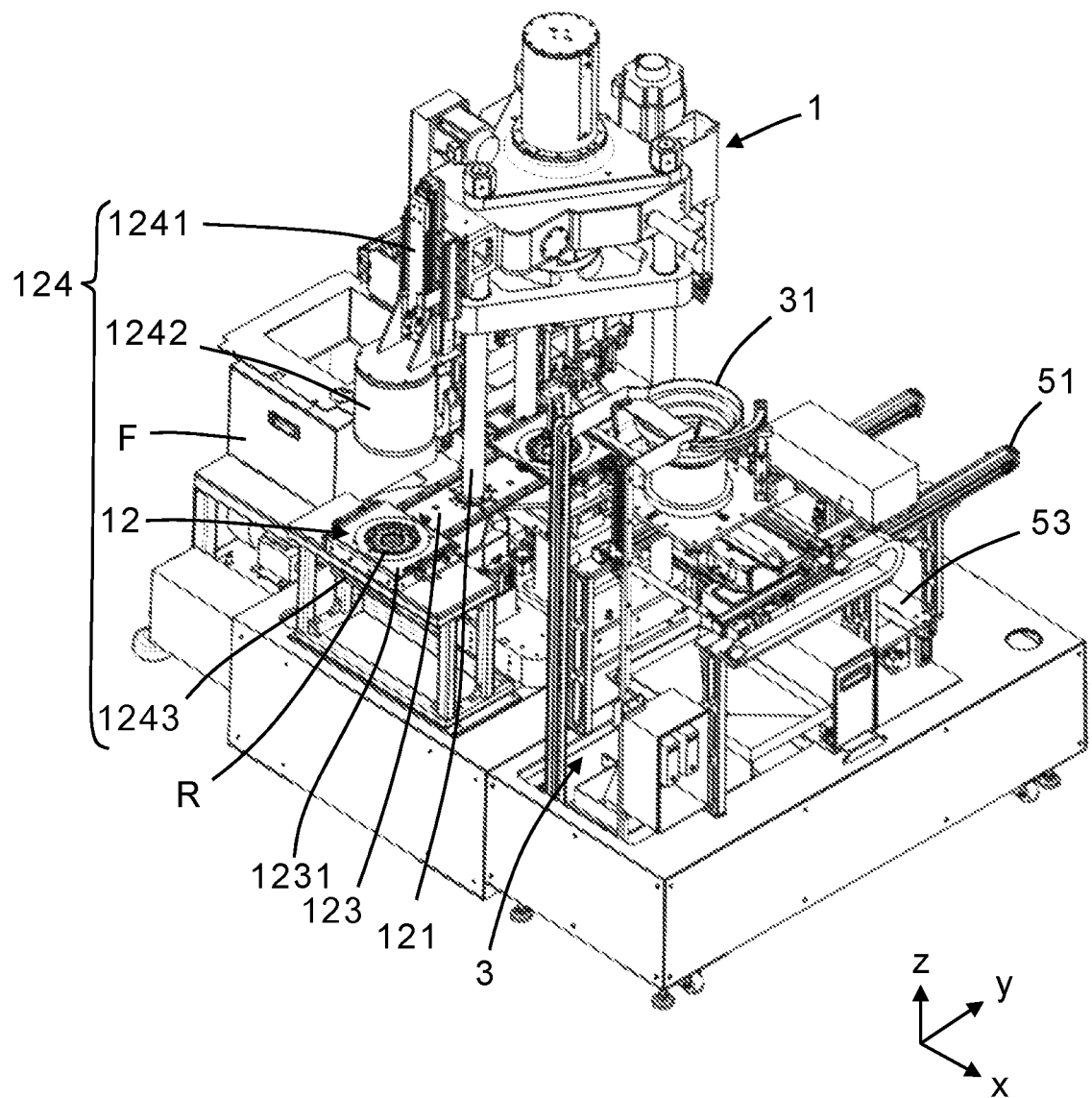
FIG. 1 is a perspective view of an apparatus for automated encapsulation of motor rotor core with magnet steel according to a preferred embodiment of the present disclosure.
Figure 2:
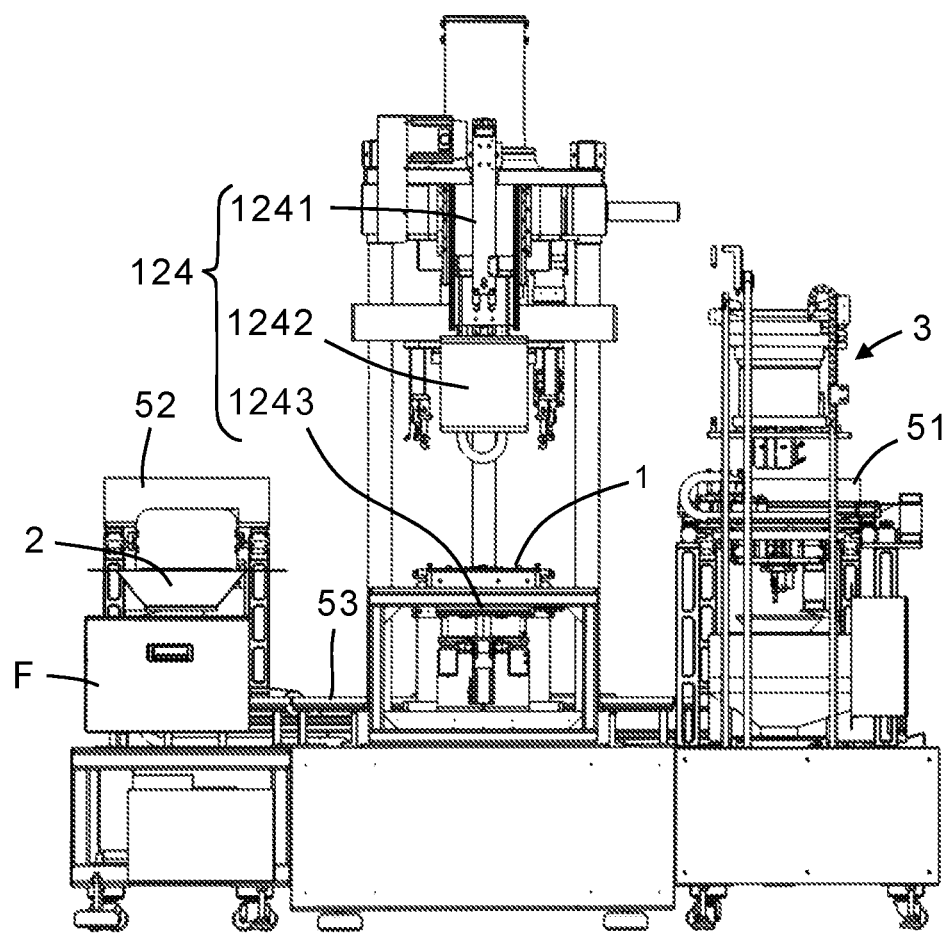
FIG. 2 is a front view of the apparatus for automated encapsulation of motor rotor core with magnet steel of FIG. 1.
Figure 3:
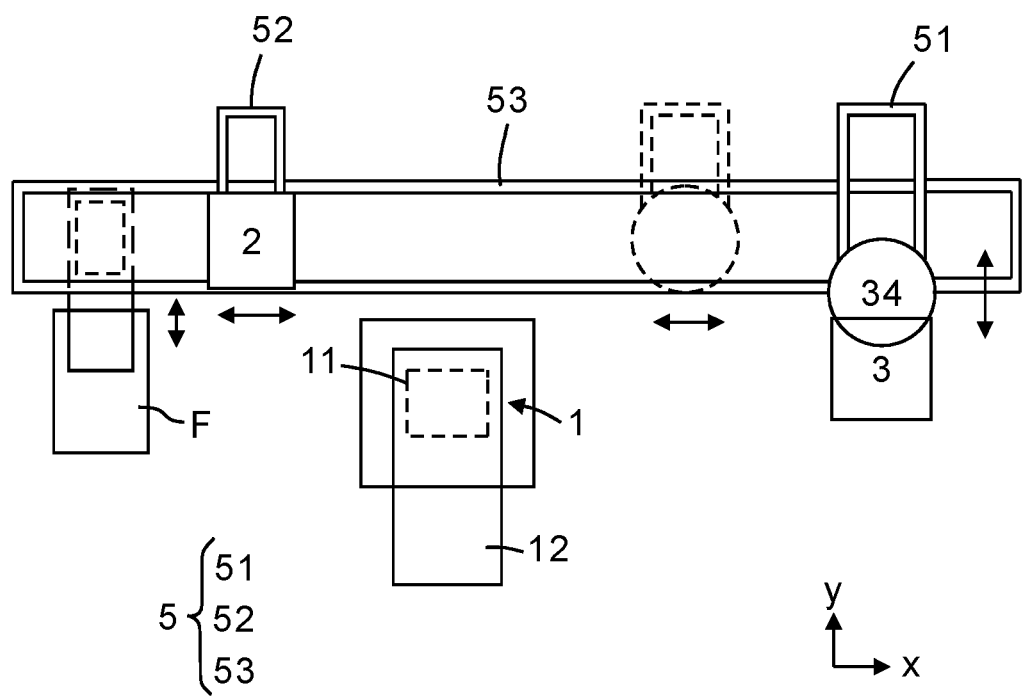
FIG. 3 is a simplified top view of the apparatus for automated encapsulation of motor rotor core with magnet steel of FIG. 1.

As shown in FIGS. 1 to 3, an apparatus for automated encapsulation of motor rotor core with magnet steel according to a preferred embodiment of the present disclosure is generally denoted by reference numeral 100 and includes at least one encapsulation unit 1, a waste removing device 2, a plastic granule feeding device 3, a control device 4 and a conveyance device 5. For the purpose of clarity and conciseness, the present disclosure is also briefly referred to as "the apparatus" herein.

Figure 4:
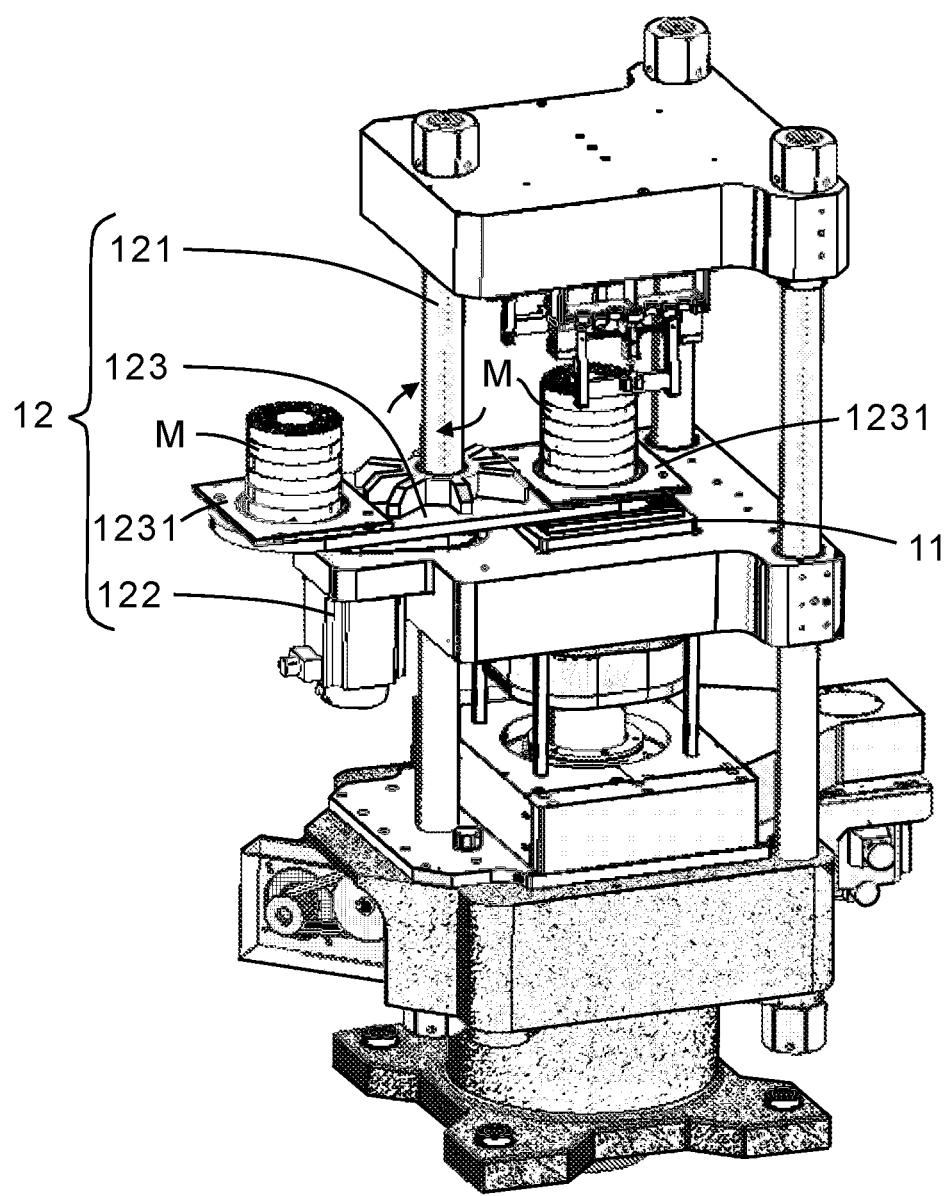
FIG. 4 is a perspective view of an encapsulation unit included in the apparatus for automated encapsulation of motor rotor core with magnet steel of FIG. 1.

Please refer to FIG. 4. The encapsulation unit 1 includes a plastic dispensing mechanism 11 and a rotor core feeding mechanism 12. The plastic dispensing mechanism 11 is used to dispense a plastic material onto a rotor core M. In the preferred embodiment, the plastic material is upwardly dispensed onto the rotor core M from an underside thereof. The rotor core feeding mechanism 12 is located to one side of the plastic dispensing mechanism 11 for feeding a plurality of rotor cores M to the plastic dispensing mechanism 11 one by one.

Figure 10:
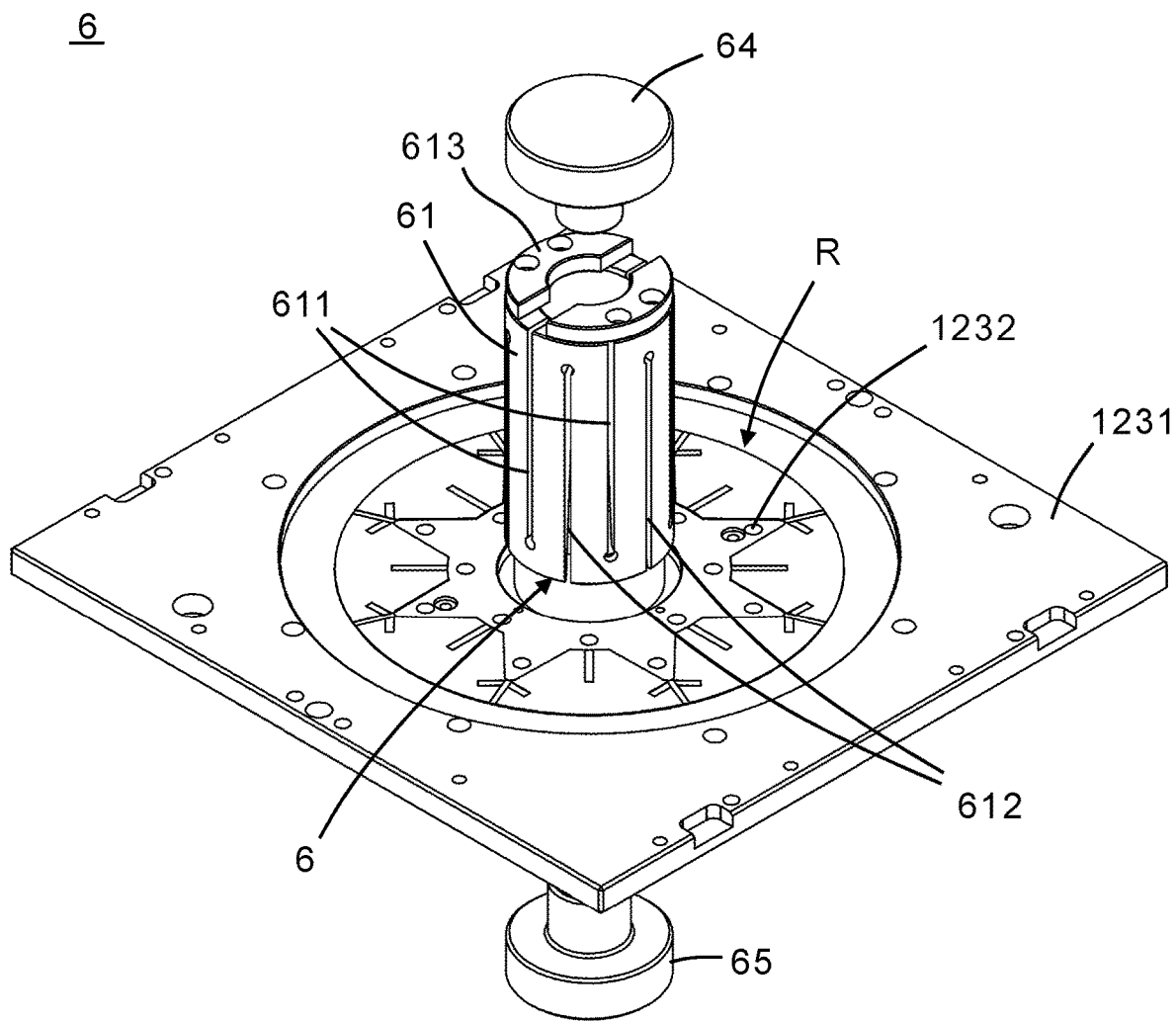
FIG. 10 is a perspective view of an inserting and expanding device included in the apparatus for automated encapsulation of motor rotor core with magnet steel of FIG. 1.

In the illustrated preferred embodiment, the rotor core feeding mechanism 12 is rotatable when it is in the rotor cores M feeding operation. More specifically, the rotor core feeding mechanism 12 includes a rotary shaft 121, a power-output device 122, and a rotor core platform 123. The rotary shaft 121 is located to one side of the plastic dispensing mechanism 11; the rotor core platform 123 has a central area fitted on around the rotary shaft 121 for carrying a plurality of plastic dispensing plates 1231 thereon. As can be seen in FIG. 10, each of the plastic dispensing plates 1231 has a receiving zone R for receiving one rotor core M therein. The plastic dispensing plate 1231 is further provided in the receiving zone R with a plurality of dispensing holes 1232, via which the plastic dispensing mechanism 11 located below the rotor core platform 123 upward dispenses a plastic material onto the rotor core M disposed in the receiving zone R.

The power-output device 122 is connected to the rotor core platform 123 for the latter to rotate, so that the plastic dispensing plates 1231 are sequentially fed to a location above the plastic dispensing mechanism 11. In the illustrated preferred embodiment, the rotor core platform 123 is two-fold symmetrical in design to have one plastic dispensing plate 1231 at each of two ends of the rotor core platform 123. Therefore, one rotor core M that is originally positioned above the plastic dispensing mechanism 11 is removed therefrom and another rotor core M is fed to above the plastic dispensing mechanism 11 whenever the rotor core platform 123 is rotated by 180 degrees. Since the rotor core platform 123 rotates continuously, the rotor cores M waiting for encapsulation are sequentially automatically fed to the plastic dispensing mechanism 11 while the rotor cores M having been encapsulated with the plastic material are sequentially removed from the plastic dispensing mechanism 11. It is noted, however, the rotor core platform 123 is not necessarily to be two-fold symmetrical, but can be three-fold symmetrical to have three plastic dispensing plates 1231 provided thereon or to be four-fold symmetrical to have four plastic dispensing plates 1231 provided thereon, depending on actual needs in production.

As shown in FIG. 3, a waste removal zone F and the plastic granule feeding device 3 are separately provided at two outer ends on one side of the plastic dispensing mechanism 11 that is opposite to the rotor core feeding mechanism 12. The waste removing device 2 is reciprocatingly movable between the waste removal zone F and the plastic dispensing mechanism 11.

Figure 6:
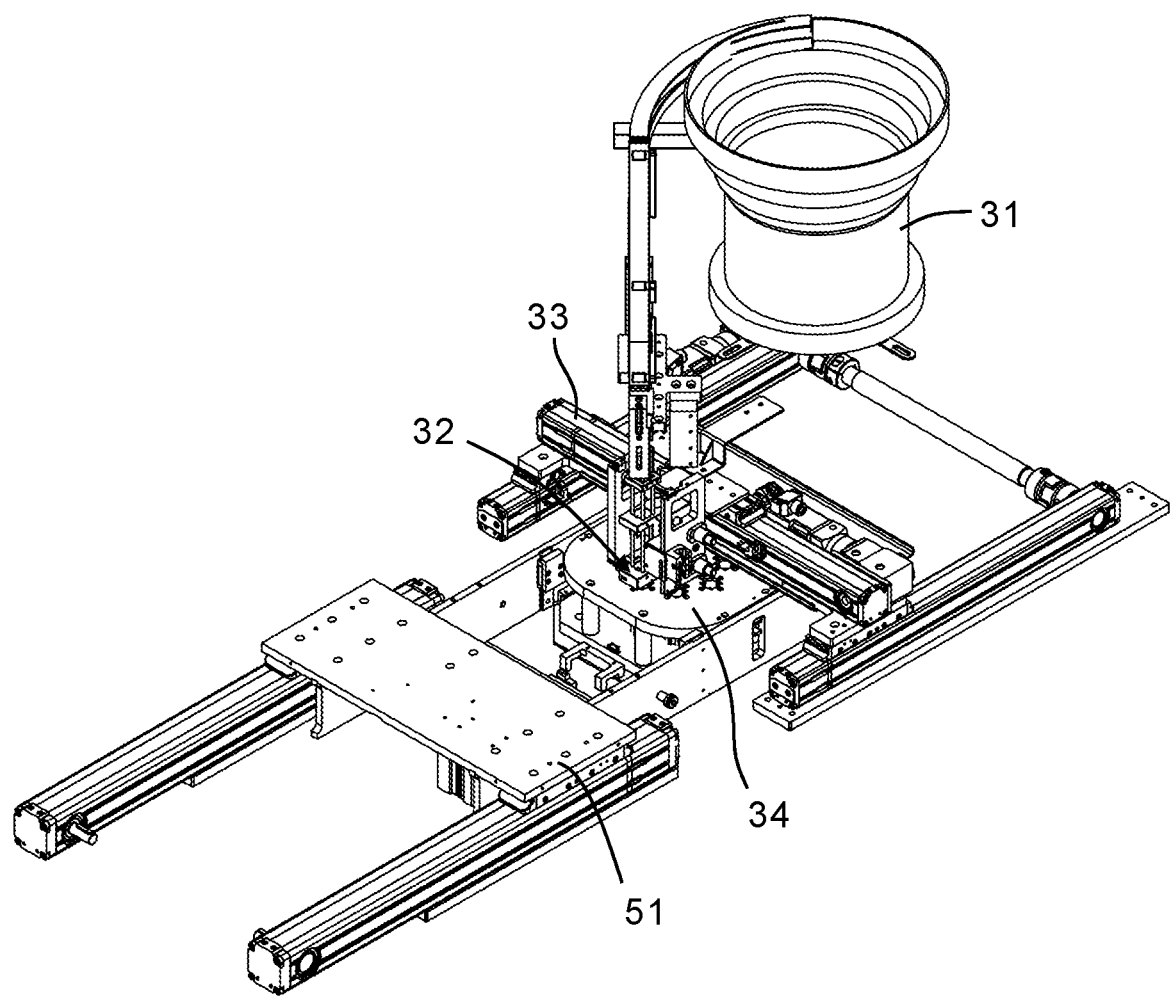
FIG. 6 is a perspective view of a plastic granule feeding device included in the apparatus for automated encapsulation of motor rotor core with magnet steel of FIG. 1.
Figure 7:
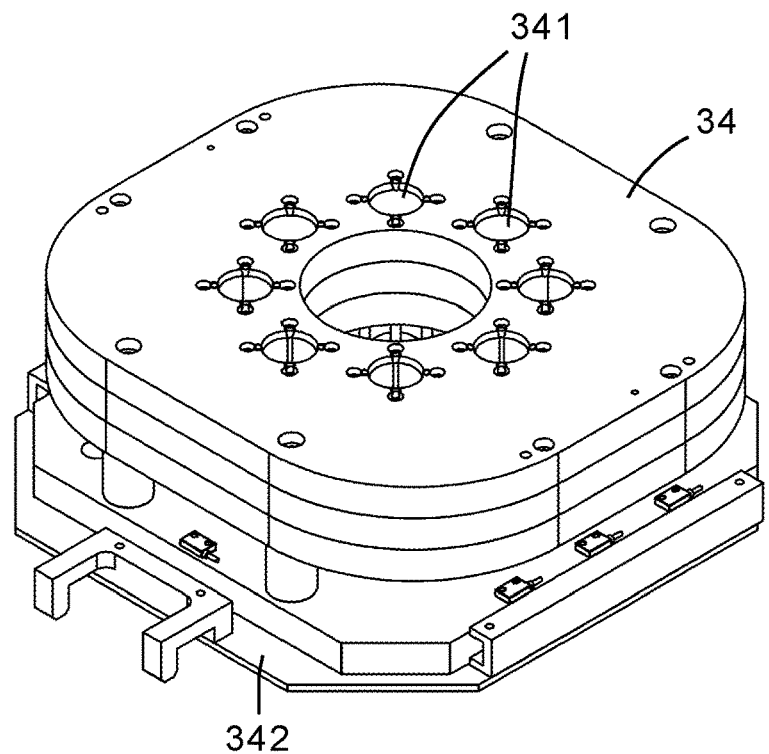
FIG. 7 is a perspective view of a transfer plate included in the apparatus for automated encapsulation of motor rotor core with magnet steel of FIG. 1.
Figure 8:
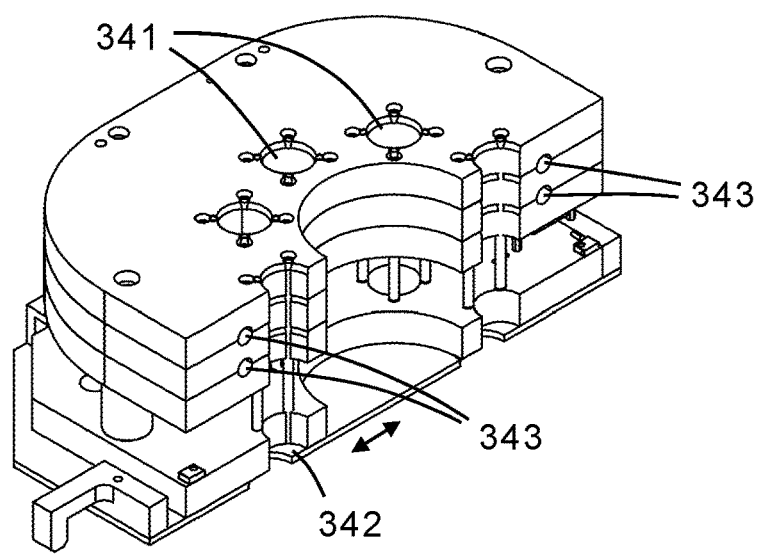
FIG. 8 is a cutaway view of the transfer plate of FIG. 7.

Please refer to FIG. 6. The plastic granule feeding device 3 includes a plastic granule storing member 31, a plastic granule conveyance tube 32, a transport member 33, and a transfer plate 34. The transport member 33 is connected to the plastic granule conveyance tube 32, which has an inlet communicable with the plastic granule storing member 31. The plastic granule storing member 31 has a plurality of plastic granules (not shown) stored therein, and is vibrated at a specific frequency for plastic granules piled in the plastic granule storing member 31 to separate from one another. The separated plastic granules are output via the plastic granule conveyance tube 32, which has an outlet facing toward a top surface of the transfer plate 34. As shown in FIG. 7, on the transfer plate 34, there are formed a plurality of granule holding cavities 341 at locations corresponding to the rotor core M. When the transport member 33 moves the plastic granule conveyance tube 32 to an open top of the granule-holding cavities 341 sequentially, plastic granules output from the plastic granule conveyance tube 32 will fall into the granule-holding cavities 341 one by one to be temporarily held on the transfer plate 34 and arrayed in a manner matching positions on the rotor core M to be dispensed with the plastic material. As shown in FIGS. 7 and 8, the transfer plate 34 is provided at a bottom with a control valve 342 for selectively opening or closing an open bottom of each granule holding cavity 341 under control. When the transfer plate 34 is located below the plastic granule conveyance tube 32 to catch the plastic granules, the control valve 342 closes and the plastic granules are kept in the granule holding cavities 341. On the other hand, when the transfer plate 34 is moved to above the plastic dispensing mechanism 11, the control valve 342 opens for the plastic granules to fall onto the plastic dispensing mechanism 11. In the illustrated preferred embodiment, the control valve 342 is in the form of a plate member with through holes. The control valve 342 is horizontally movable for the through hole to communicate with or not communicate with the granule holding cavities 341. However, it is understood the present disclosure is not particularly limited thereto and the control valve 342 can be other structural members and operated according to different principles.

As shown in FIGS. 1 to 3, the conveyance device 5 includes a conveyance rail 53, a first conveyance mechanism 51 and a second conveyance mechanism 52. The conveyance rail 53 extends in parallel to a straight line connecting the plastic dispensing mechanism 11, the plastic granule feeding device 3 and the waste removal zone F. The first conveyance mechanism 51 is connected to the transfer plate 34, allowing the latter to slide on the conveyance rail 53 and be fed to below the plastic granule conveyance tube 32 and to the plastic dispensing mechanism 11. The second conveyance mechanism 52 is connected to the waste removing device 2, allowing the latter to slide on the conveyance rail 53 and be fed to the waste removal zone F and the plastic dispensing mechanism 11.

Figure 5:
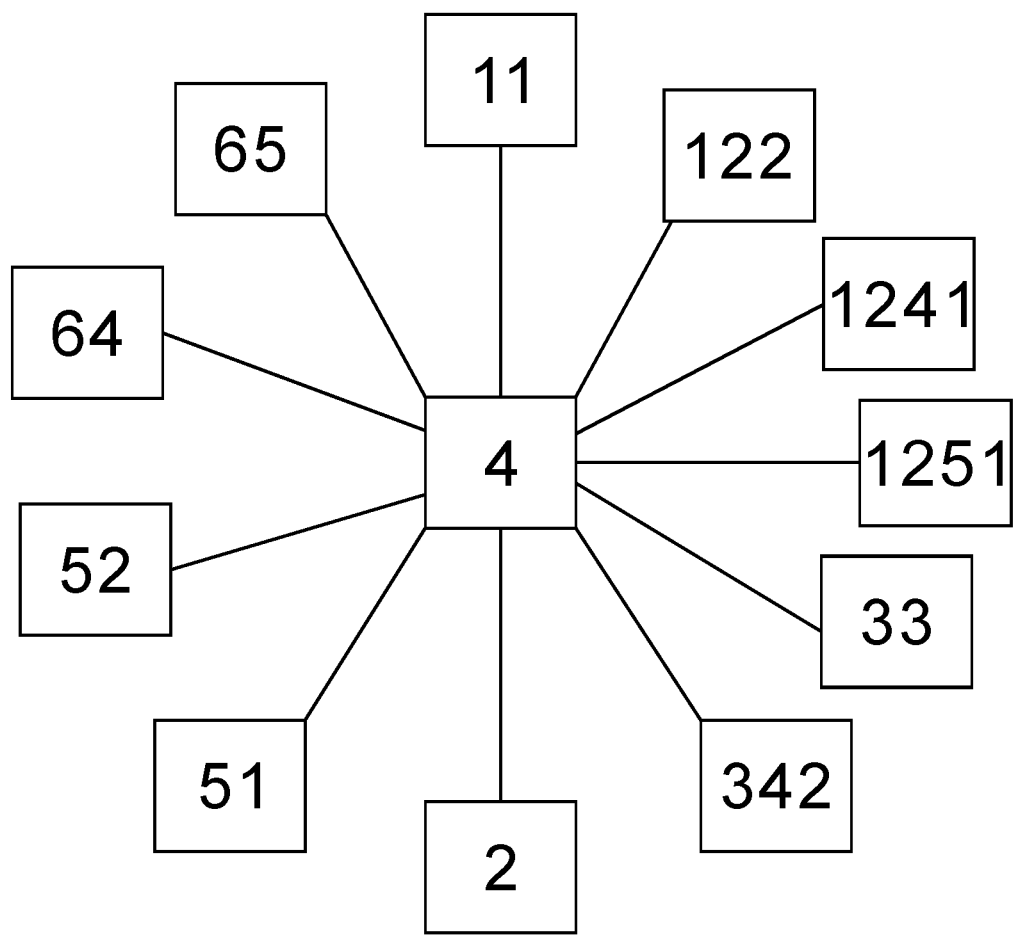
FIG. 5 is a block view showing the signal connection of a control device included in the apparatus for automated encapsulation of motor rotor core with magnet steel of FIG. 1 to other parts of the apparatus.

As shown in FIG. 5, the control device 4 is connected to the plastic dispensing mechanism 11, the power-output device 122 of the rotor core feeding mechanism 12, the transport member 33, the control valve 342, the waste removing device 2, the first conveyance mechanism 51 and the second conveyance mechanism 52 through signals.

The following describes how the control device 4 controls the above-mentioned parts to work cooperatively.

First, the control device 4 controls the first conveyance mechanism 51 to move the transfer plate 34 to a position corresponding to the plastic granule feeding device 3. It is noted the first conveyance mechanism 51 not only can cause the transfer plate 34 to slide along the conveyance rail 53, but also can cause the transfer plate 34 to move forward and backward in a direction perpendicular to the conveyance rail 53, so that the outlet of the plastic granule conveyance tube 32 is aligned with the transfer plate 34. Then, the control device 4 controls the transport member 33 to move the plastic granule conveyance tube 32 horizontally, so that the plastic granule conveyance tube 32 moves on a top of the transfer plate 34 and dispenses plastic granules into the granule holding cavities 341. In this process, the control device 4 also controls the control valve 342 to a closed position.

On the other hand, the control device 4 controls the power-output device 122 for the rotor core platform 123 to rotate, so that one of the plastic dispensing plates 1231 and the rotor core M carried thereon waiting for plastic dispensing and encapsulation are fed to above the plastic dispensing mechanism 11 and ready for plastic dispensing.

Then, the control device 4 further controls the first conveyance mechanism 51 to move the transfer plate 34, so that the transfer plate 34 slides along the conveyance rail 53 to a position corresponding to the plastic dispensing mechanism 11. It is noted the first conveyance mechanism 51 can move the transfer plate 34 forward and backward in a direction perpendicular to the conveyance rail 53, so that the transfer plate 34 can be located directly above the plastic dispensing mechanism 11. At this point, the transfer plate 34 is located below the plastic dispensing plate 1231 and above the plastic dispensing mechanism 11, and the control device 4 controls the control valve 342 to the open position, allowing the plastic granules to fall from a predetermined position and be fed to the plastic dispensing mechanism 11. By repeating the above-described operation, the transfer plate 34 can move reciprocatingly between the position corresponding to the plastic granule storing member 31 and another position corresponding to the plastic dispensing mechanism 11, allowing the plastic granules to be continuously dispensed onto the positions defined by the plastic dispensing mechanism 11.

When the transfer plate 34 is moved away from the position corresponding to the plastic dispensing mechanism 11, the control device 4 controls the plastic dispensing mechanism 11 to move upward or controls the rotor core platform 123 to move downward, so that the plastic dispensing mechanism 11 can dispense the plastic material onto the rotor core M via the dispensing holes 1232 on the plastic dispensing plate 1231. Since the plastic granules dispensed on the plastic dispensing mechanism 11 are arrayed corresponding to the positions on the rotor core M for dispensing the plastic material, the plastic dispensing mechanism 11 can directly press and heat the dispensed plastic granules to a molten state when the rotor core M is located directly above the plastic dispensing mechanism 11, so that the molten plastic material is dispensed onto the rotor core M. In the process of plastic dispensing, the control device 4 can synchronously control the first conveyance mechanism 51 and the transport member 33 to perform the above-mentioned plastic granule dispensing.

After the plastic dispensing is completed, the rotor core platform 123 is separated from the plastic dispensing mechanism 11 by moving the rotor core platform 123 upward or moving the plastic dispensing mechanism 11 downward, and the control device 4 controls the second conveyance mechanism 52 to move the waste removing device 2 toward the plastic dispensing mechanism 11. The second conveyance mechanism 52 can move the waste removing device 2 forward or backward in a direction perpendicular to the conveyance rail 53 for the waste removing device 2 to be located directly above the plastic dispensing mechanism 11.

When the waste removing device 2 is moved to a position corresponding to and directly above the plastic dispensing mechanism 11 as well as below the rotor core platform 123, the control device 4 controls the waste removing device 2 to remove waste that is remained on the plastic dispensing mechanism 11. In the illustrated preferred embodiment, the waste removing device 2 is a suction device capable of removing the waste from the plastic dispensing mechanism 11 using a suction force. However, in other operable embodiments, other differently designed waste removing device 2 can be adopted.

After the waste is sucked away, the control device 4 controls the second conveyance mechanism 52 to move the waste removing device 2 to the waste removal zone F. Meanwhile, the rotor core M that has been dispensed with plastic is removed from the plastic dispensing mechanism 11 and another rotor core M waiting for plastic dispensing is fed to the plastic dispensing mechanism 11.

When the waste removing device 2 is moved to the position corresponding to the waste removal zone F, the control device 4 controls the waste removing device 2 to release the sucked waste for the same to fall into the waste removal zone F. By repeating the above-described operations, the waste removing device 2 is reciprocatingly moved between the position corresponding to the waste removal zone F and the position corresponding to the plastic dispensing mechanism 11 to enable automated removal of waste left on the plastic dispensing mechanism 11 during the production process.

As a matter of fact, the operating steps of the apparatus for automated encapsulation of motor rotor core with magnet steel 100 according to the present disclosure are not necessary to be limited to the above sequence. The sequence of these steps can be changed or adjusted according to actual processing conditions.

With the apparatus 100 according to the present disclosure, the rotor core feeding mechanism 12 can be driven to operate and feed the rotor cores M to the plastic dispensing mechanism 11 in cycles under a coordinated control of the control device 4. Meanwhile, the plastic granule storing member 31 is vibrated to separate the plastic granules before they are output via the plastic granule conveyance tube 32 for dispensing into corresponding granule holding cavities 341 and stored therein temporarily. In this step, small-sized plastic granules are used to enable pre-arrayed plastic granules and avoid the problems in using large-sized plastic granules, such as long preheating time, uneven filling quality, low practical utilization of plastic granules, etc., and can therefore, effectively reduce the cost of using plastic granules. The transfer plate 34 is moved by the first conveyance mechanism 51 to above the plastic dispensing mechanism 11, and the control valve 342 can be selectively set to an open position or a closed position for filling of the plastic granules into the plastic dispensing mechanism 11 under control. After the plastic dispensing is completed, the waste removing device 2 is moved by the second conveyance mechanism 52 to transport waste to the waste removal zone F, while the rotor core M that has been dispensed with the plastic material is moved from the plastic dispensing mechanism 11 by the rotor core feeding mechanism 12. Therefore, automated removal of waste is realized.

The apparatus 100 of the present disclosure enables automated feeding of rotor cores M, automated feeding of plastic granules and automated removal of waste to achieve an overall automated encapsulation of the motor rotor core with magnet steel, which in turn enables automated mass production of rotor cores M. The apparatus 100 enables automated plastic dispensing onto laminated iron core to thereby ensure secured assembly of the laminated iron core and firm bonding of the magnet steel to the rotor core, which in turn gives the motor rotors upgraded quality and performance.

Further, in an operable embodiment of the present disclosure, as shown in FIG. 8, the transfer plate 34 is provided near the granule holding cavities 341 with a plurality of heating elements 343 for preheating and softening the plastic granules received in the granule holding cavities 341, so as to enable shortened processing time and upgraded quality of plastic dispensing.

Figure 9:
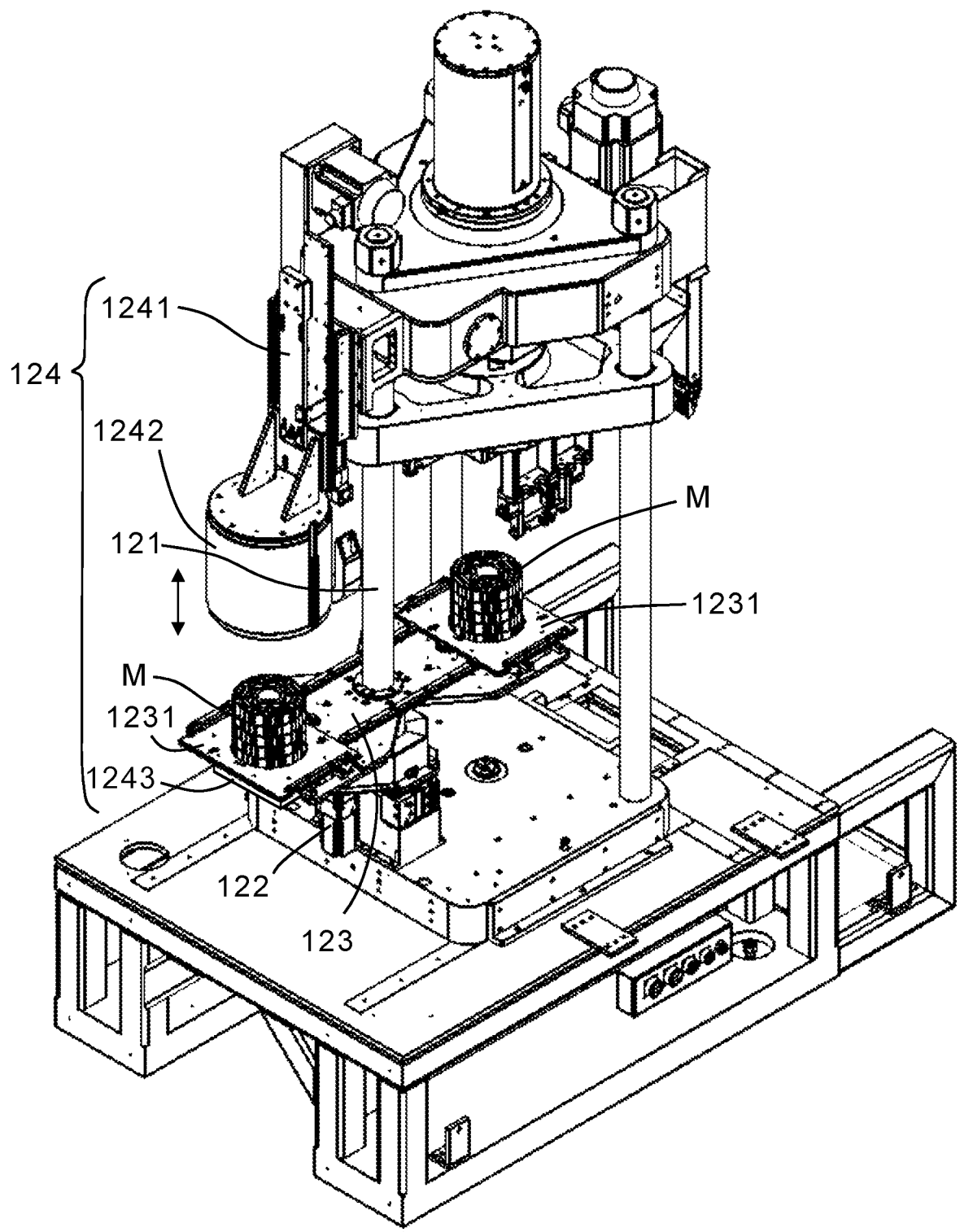
FIG. 9 is a perspective view of a thermal insulation device included in the apparatus for automated encapsulation of motor rotor core with magnet steel of FIG. 1.

Moreover, in an operable embodiment of the present disclosure, as shown in FIGS. 1, 5 and 9, the rotor core feeding mechanism 12 further includes a thermal insulation device 124, which includes an elevating arm 1241, an insulation hood 1242, and a bottom heating plate 1243. The elevating arm 1241 is connected to the insulation hood 1242 and the bottom heating plate 1243 is located below the insulation hood 1242. The control device 4 is connected to the elevating arm 1241 through signals to control the elevating arm 1241 to move vertically. When one plastic dispensing plate 1231 and the rotor core M carried thereon are located in alignment with the plastic dispensing mechanism 11, the control device 4 controls the elevating arm 1241 to lower, so that the thermal insulation device 124 encloses another rotor core M that is located outside the plastic dispensing mechanism 11 and waiting for plastic dispensing. At this point, the bottom heating plate 1243 is located directly below the plastic dispensing plate 1231 that has not yet been fed to the plastic dispensing mechanism 11. The rotor core M waiting for plastic dispensing is sandwiched between and kept warm by the thermal insulation device 124 and the bottom heating plate 1243, so as to have a temperature close to that required by the process, which facilitates good quality of plastic dispensing in subsequent steps.

Figure 11:
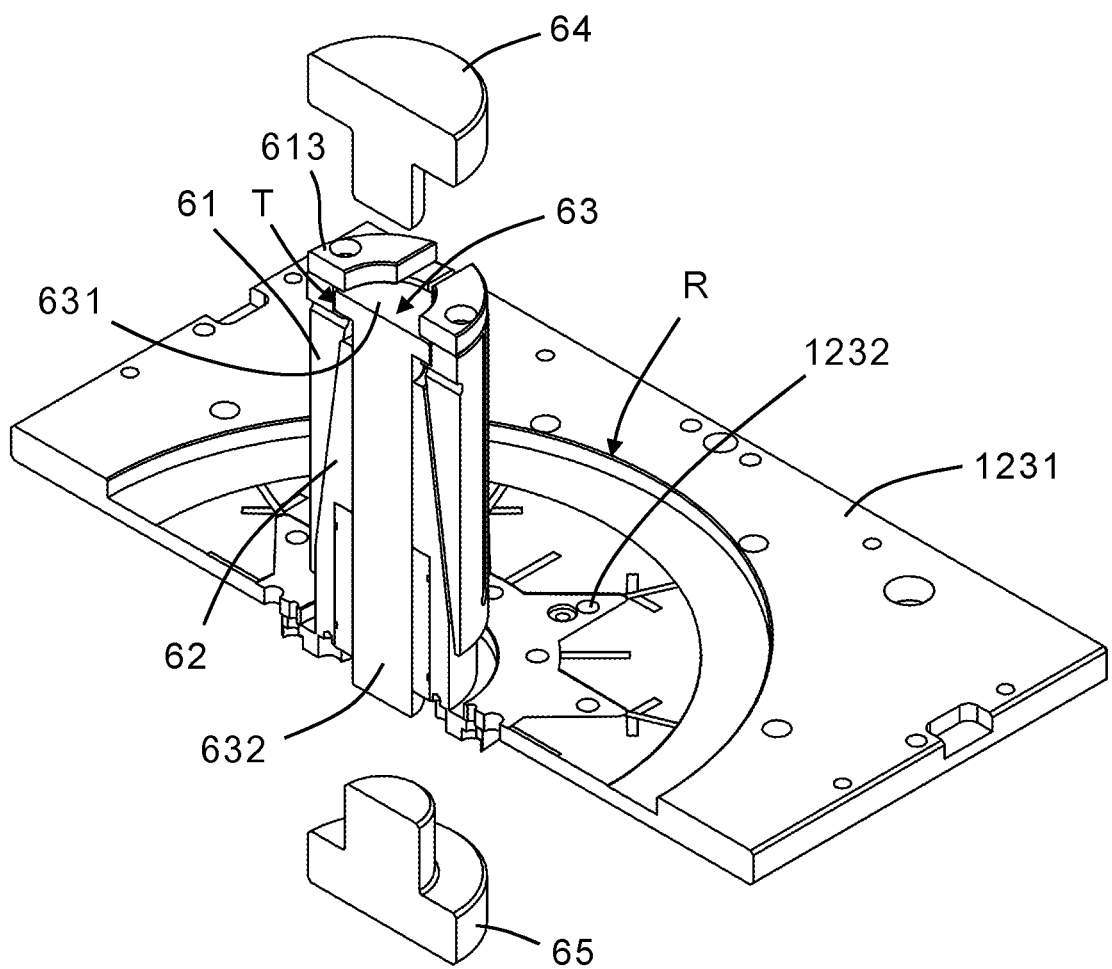
FIG. 11 is a cutaway view of FIG. 10.
Figure 12A:
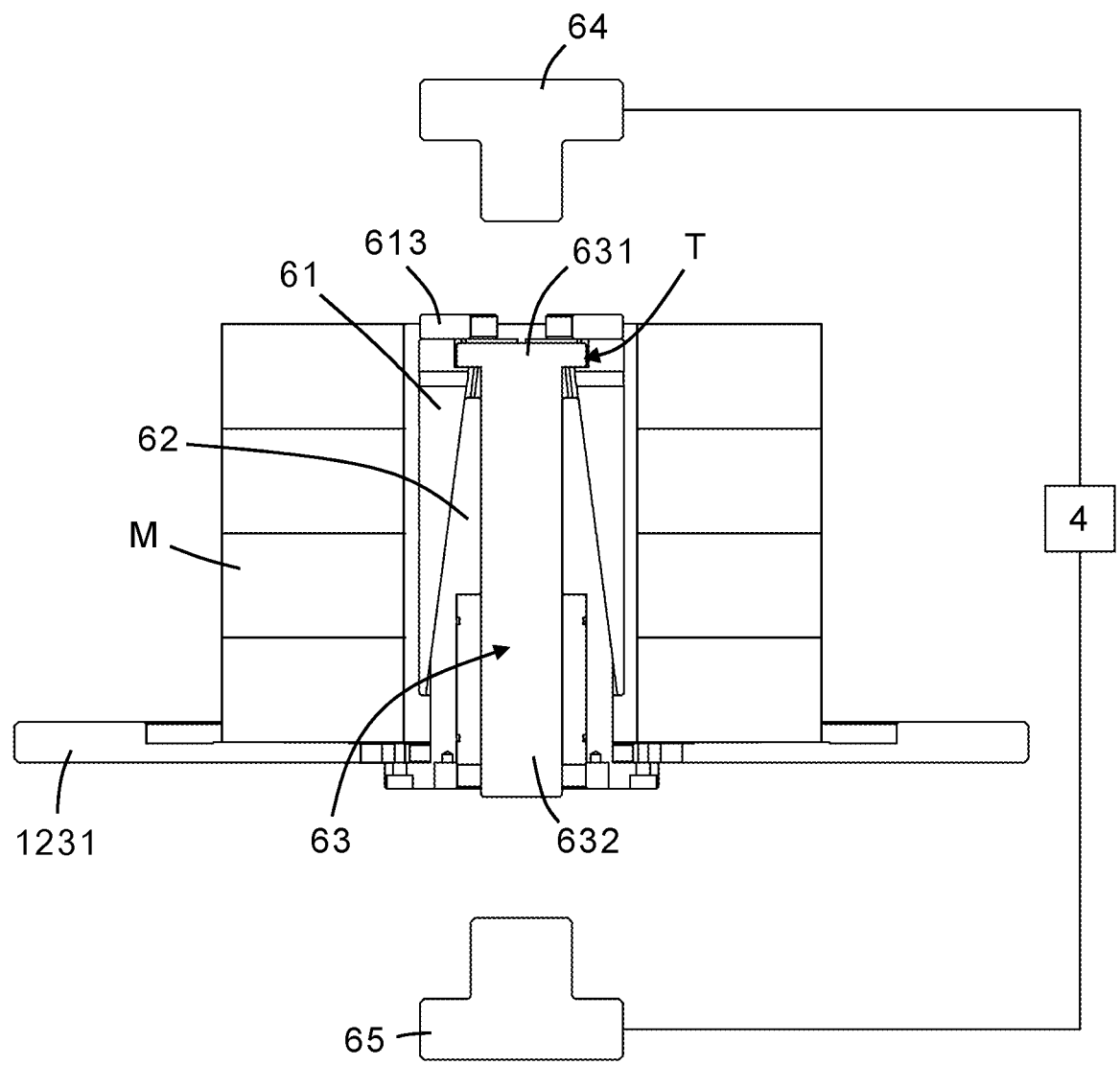
FIG. 12A shows the manner of operating the inserting and expanding device of FIG. 10.

In a further operable embodiment of the present disclosure, as shown in FIGS. 10, 11 and 12A, the apparatus 100 further includes an inserting and expanding device 6, which includes an outer sleeve 61, an inner sleeve 62, an insertion shaft 63, a powered pressing element 64, and a powered restoring element 65.

As shown in FIG. 11 and FIGS. 12A to 12C, the inner sleeve 62 is in the form of an upward tapered cone, which is connected at its lower end to the plastic dispensing plate 1231 of the rotor core feeding mechanism 12.

As can be seen in FIGS. 10 and 12A, the outer sleeve 61 has its outer surface facing toward an inner surface of a shaft hole of the rotor core M. Referring to FIG. 10. The outer sleeve 61 is provided with a plurality of upper slits 611 that are axially downward extended from an upper end of the outer sleeve 61 by a predetermined length, and a plurality of lower slits 612 that are axially upward extended from a lower end of the outer sleeve 61 by a predetermined length. The upper slits 611 and the lower slits 612 are circumferentially equally spaced and are located in a staggered arrangement. With this design, the outer sleeve 61 has an outer diameter that is flexibly changeable when the outer sleeve 61 is downward pressed by an external force.

As can be seen in FIG. 11 and FIGS. 12A to 12C, a receiving space T and an anti-detachment section 613 are formed atop the outer sleeve 61.

The insertion shaft 63 includes a head portion 631 and a body portion 632. The body portion 632 axially extends through the inner sleeve 62, the head portion 631 is set in the receiving space T, and the anti-detachment section 613 is abutted against the head portion 631 along the latter's top edge. The receiving space T and the anti-detachment section 613 work together to restrict the insertion shaft 63 from moving relative to the outer and the inner sleeve 61, 62.

The powered pressing element 64 and the powered restoring element 65 are connected to the control device 4 through signals. The powered pressing element 64 is located in the vicinity of the head portion 631 of the insertion shaft 63, and the powered restoring element 65 is located in the vicinity of the lower end of the inner sleeve 62.

In the following paragraphs, the way of changing the outer diameter of the outer sleeve 61 is described.

As shown in FIG. 12A, the rotor core M is positioned on the plastic dispensing plate 1231 with its shaft hole aligned with and fitted around the inserting and expanding device 6. The outer sleeve 61 before being expanded does not tightly bear against the inner surface of the shaft hole of the rotor core M. It is noted that, in FIGS. 12A to 12C, the gap between the outer sleeve 61 and the inner surface of the shaft hole of the rotor core M is purposefully increased to facilitate easy understanding of the present disclosure. In practical implementation of the present disclosure, the real dimensions of the parts and the scale thereof are not necessarily the same as those shown in the attached drawings.

Figure 12B:
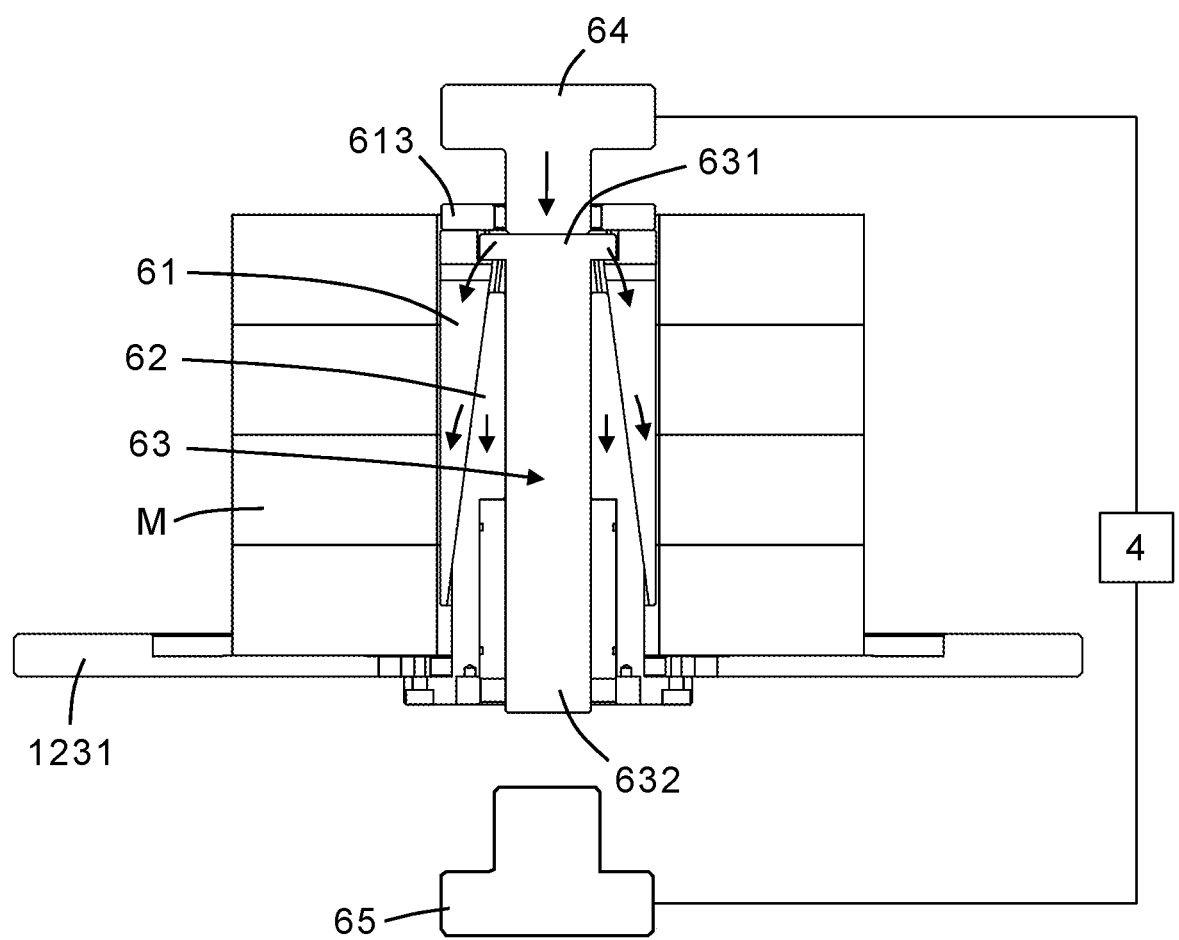
FIG. 12B shows the manner of operating the inserting and expanding device of FIG. 10.

Thereafter, as shown in FIG. 12B, the control device 4 controls the powered pressing element 64 to press against the head portion 631 in an axial direction of the insertion shaft 63, causing the head portion 631, which is located in the receiving space T, to downward press against the outer sleeve 61. At this point, the outer sleeve 61 subjected to the downward pressing force is outward expanded to have an increased outer diameter, so that the outer sleeve 61 has its outer surface fitly contact with the inner surface of the shaft hole of the rotor core M. That is, the shaft hole of the rotor core M is now tightly fitted around the outer sleeve 61, which ensures more precise angular positions of multiple layers of the laminated rotor core M relative to one another.

Figure 12C:
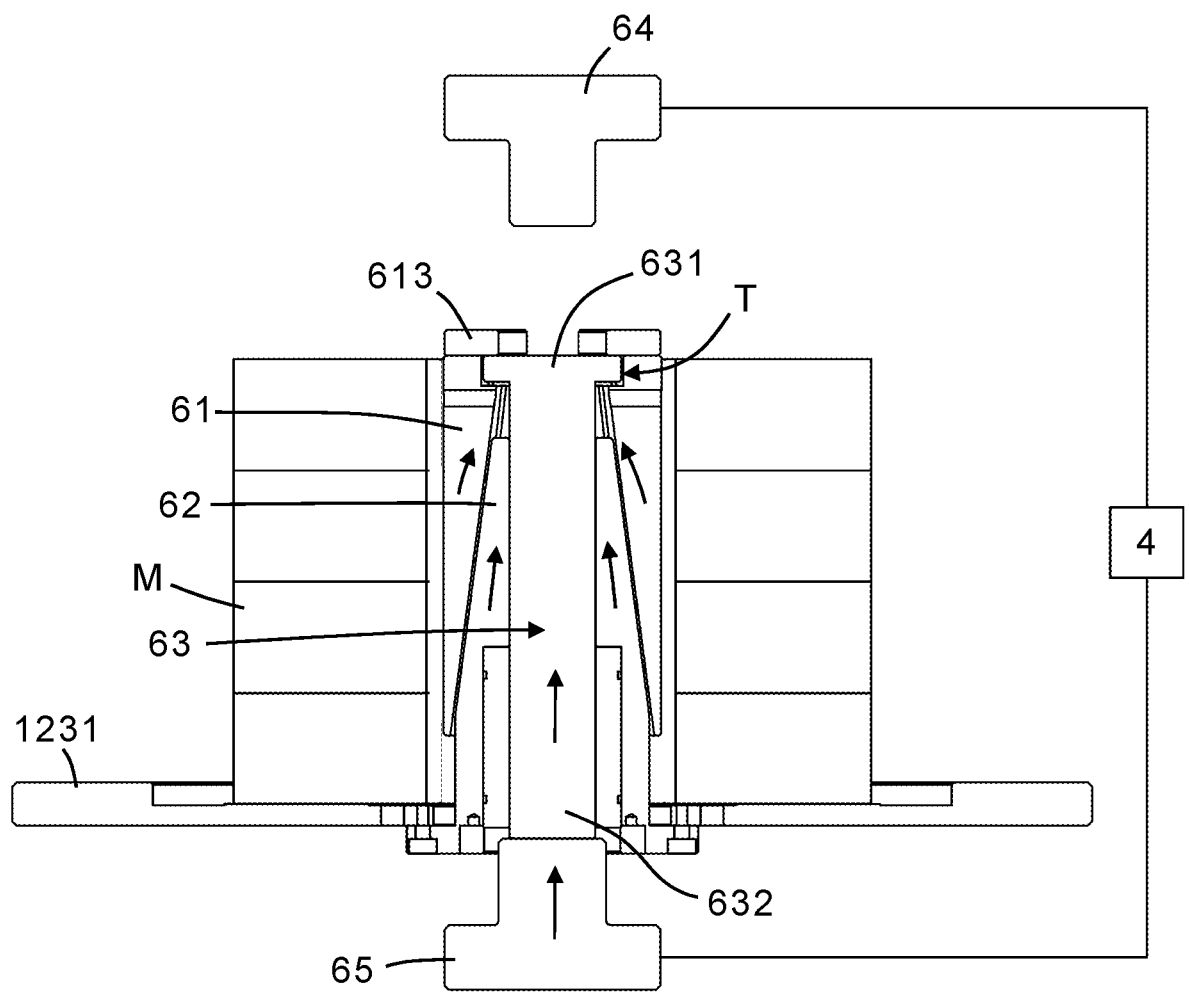
FIG. 12C shows the manner of operating the inserting and expanding device of FIG. 10.

Referring to FIG. 12C. To remove the rotor core M from the inserting and expanding device 6, the control device 4 controls the powered restoring element 65 to upward press against the body portion 632 in a reverse axial direction of the insertion shaft 63, so that the insertion shaft 63 is pushed upward until it touches the anti-detachment section 613. At this point, the outer sleeve 61 is subjected to an upward force that brings its expanded outer diameter to restore to its original position and shape. In this way, the gap between the outer sleeve 61 and the inner surface of the shaft hole of the rotor core M is increased, permitting the rotor core M to be easily removed from the inserting and expanding device 6 and the plastic dispensing plate 1231.

Figure 13:
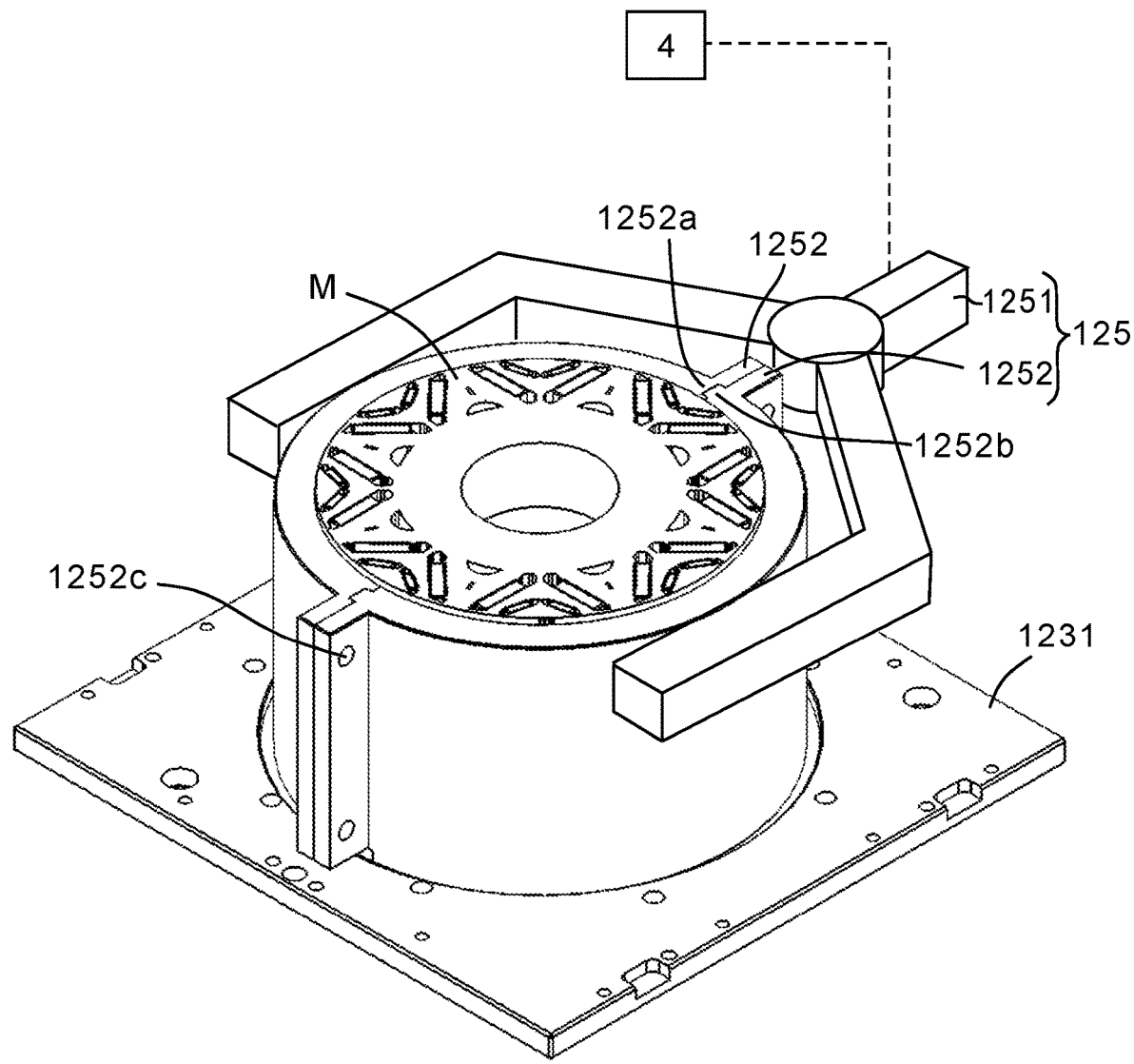
FIG. 13 is an outer-diameter limiting device included in the apparatus for automated encapsulation of motor rotor core with magnet steel of FIG. 1.

In a further operable embodiment as shown in FIG. 13, the rotor core feeding mechanism 12 further includes an outer diameter (OD) limiting device 125, which includes a movable arm 1251 and two half-circular retaining frames 1252 shaped corresponding to the rotor core M. The two half-circular retaining frames 1252 respectively include a fastening section 1252a, 1252b, which can be tightened to one another. The fastening sections 1252a, 1252b are identical to each other in shape. When the two half-circular retaining frames 1252 are placed face to face, the fastening sections 1252a, 1252b form a pair to be lockable together. It is noted the fastening sections 1252a, 1252b are not necessary to have a shape as that illustrated in FIG. 13. The half-circular retaining frames 1252 are further provided with fastening holes 1252c, through which screws can be extended to lock the two half-circular retaining frames 1252 together outside the rotor core M, allowing the rotor core M to maintain its configuration. The movable arm 1251 is connected to the control device 4 through signals for driving the two half-circular retaining frames 1252 to move onto the plastic dispensing plate 1231 of the rotor core feeding mechanism 12. The control device 4 further controls the movable arm 1251 to move, so that the two half-circular retaining frames 1252 encloses the rotor core M in between them. It is noted the shape of the movable arm 1251 and the connection of the movable arm 1251 to the half-circular retaining frames 1252 are not necessary to be the same as those illustrated in the attached drawings.

Figure 14:
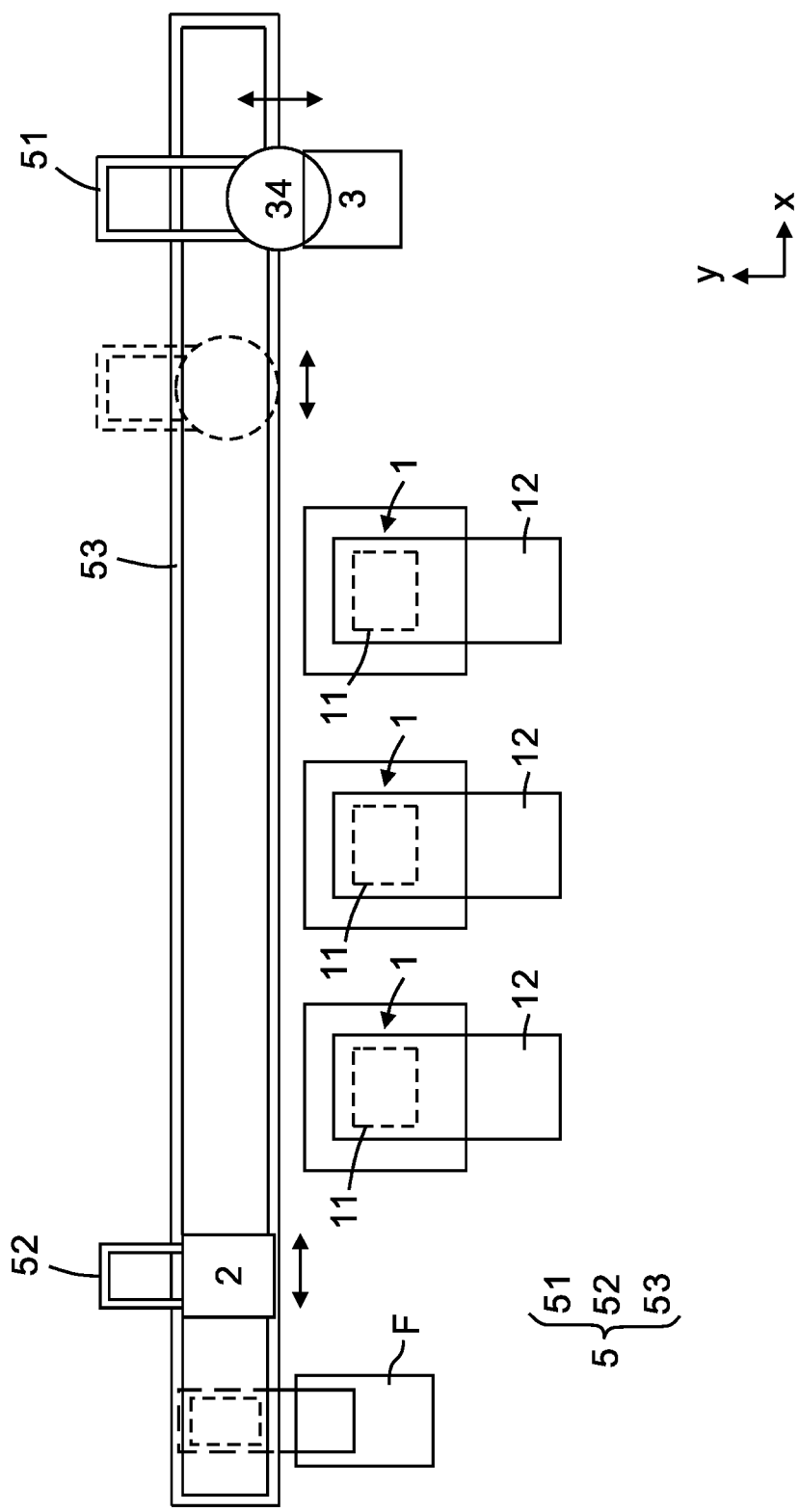
FIG. 14 is a simplified top view of an apparatus for automated encapsulation of motor rotor core with magnet steel according to another embodiment of the present disclosure, in which a plurality of encapsulation units are included.

According to another embodiment shown in FIG. 14, there are included a plurality of parallelly arranged encapsulation units 1 and one conveyance rail 53 that is common for use by all the encapsulation units 1. In this embodiment, the encapsulation units 1 are arranged in parallel, and the plastic granule feeding device 3 and the waste removal zone F are located at two outermost ends of the parallelly arranged encapsulation units 1. The control device 4 controls the first conveyance mechanism 51 to move between the position corresponding to the plastic granule storing member 31 and the positions corresponding to the plastic dispensing mechanisms 11. Therefore, the encapsulation units 1 can be parallelly arranged to work in cooperation with one another without increasing the number of other parts, such as the plastic granule feeding device 3 and the waste removing device 2.

Figure 15:
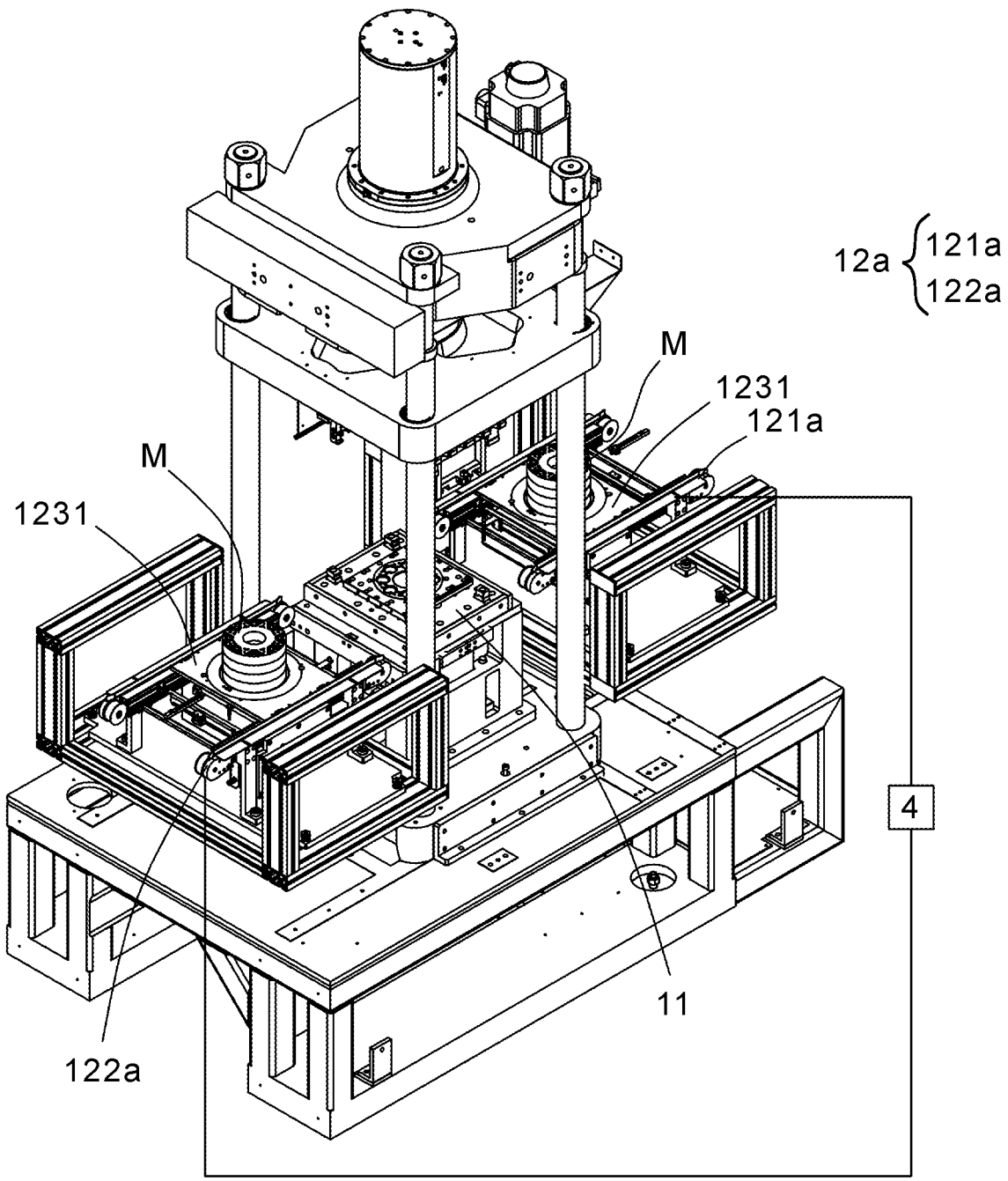
FIG. 15 is a perspective view of an apparatus for automated encapsulation of motor rotor core with magnet steel according to a further embodiment of the present disclosure having a differently designed rotor core feeding mechanism.

In another embodiment as shown in FIG. 15, another type of rotor core feeding mechanism 12a is included. The rotor core feeding mechanism 12a does not feed the rotor cores M to the plastic dispensing mechanism 11 in the above-described rotational manner, but linearly feeds a plurality of rotor cores M to the plastic dispensing mechanism 11 one by one. The rotor core feeding mechanism 12a includes two conveyance tracks 121a, 122a located at a rotor core inlet and a rotor core outlet, respectively, of the plastic dispensing mechanism 11. The control device 4 is connected to the two conveyance tracks 121a, 122a through signals for the rotor cores M to be fed to and removed from the plastic dispensing mechanism 11 sequentially.

While the present disclosure has been described by means of specific embodiments, numerous modifications and variations could be made thereto by those skilled in the art without departing from the scope and spirit of the present disclosure set forth in the claims.

What is claimed is:

1. An apparatus for automated encapsulation of motor rotor core with magnet steel, comprising:
at least one encapsulation unit, each including a plastic dispensing mechanism and a rotor core feeding mechanism; the rotor core feeding mechanism being located to one side of the plastic dispensing mechanism for feeding a plurality of rotor cores to the plastic dispensing mechanism one by one;
a plastic granule feeding device including a plastic granule storing member, a plastic granule conveyance tube, a transport member and a transfer plate; the transport member being connected to the plastic granule conveyance tube, which has an inlet communicable with the plastic granule storing member and an outlet facing toward a top surface of the transfer plate; the transfer plate being formed with a plurality of granule holding cavities at locations corresponding to the rotor core; and the transfer plate being provided at a bottom with a control valve for opening and closing a bottom of each of the granule holding cavities;

a waste removing device;

a conveyance device including a conveyance rail, a first conveyance mechanism and a second conveyance mechanism; the conveyance rail extending in parallel to a straight line connecting the plastic dispensing mechanism, the plastic granule feeding device and a waste removal zone; the first conveyance mechanism being connected to the transfer plate, allowing the transfer plate to slide on the conveyance rail; and the second conveyance mechanism being connected to the waste removing device, allowing the waste removing device to slide on the conveyance rail; and a control device being connected to the plastic dispensing mechanism, the rotor core feeding mechanism, the transport member, the control valve, the waste removing device, the first conveyance mechanism, and the second conveyance mechanism through signals;

wherein the control device controls the rotor core feeding mechanism for the rotor cores to be sequentially fed to and removed from the plastic dispensing mechanism;

wherein the control device controls the transport member for the plastic granule conveyance tube to move on a top of the transfer plate and dispense plastic granules into the granule holding cavities;

wherein the control device controls the first conveyance mechanism to move the transfer plate, so that the transfer plate moves reciprocatingly between a position corresponding to the plastic granule storing member and another position corresponding to the plastic dispensing mechanism; when the transfer plate is located at the position corresponding to the plastic dispensing mechanism, the control device controls the control valve to open the granule holding cavities, so that the plastic granules in the granule holding cavities are fed to the plastic dispensing mechanism; and on the other hand, when the transfer plate is located at the position corresponding to plastic granule storing member, the control device controls the control valve to close the granule holding cavities;

wherein the control device controls the plastic dispensing mechanism to dispense plastic onto the rotor cores; and wherein the control device also controls the second conveyance mechanism to move the waste removing device, so that the waste removing device moves reciprocatingly between a position corresponding to the waste removal zone and another position corresponding to the plastic dispensing mechanism; when the waste removing device is located at the position corresponding to the plastic dispensing mechanism, the control device controls the waste removing device to remove waste from the plastic dispensing mechanism; and on the other hand, when the waste removing device is located at the position corresponding to the waste removal zone, the control device controls the waste removing device to release the waste therefrom.

2. The apparatus according to claim 1, wherein the rotor core feeding mechanism includes a rotary shaft, a power-output device and a rotor core platform; the rotary shaft being located to one side of the plastic dispensing mechanism, and the rotor core platform having a central area fitted on around the rotary shaft for carrying a plurality of plastic dispensing plates thereon; each of the plastic dispensing plates having a receiving zone for receiving one rotor core therein; and the power-output device being connected to the rotor core platform for the rotor core platform to rotate, so that the plastic dispensing plates are sequentially fed to the plastic dispensing mechanism.

3. The apparatus according to claim 2, wherein the control device is connected to the power-output device through signals and controls the power-output device for the plastic dispensing plates to be sequentially fed to and removed from the plastic dispensing mechanism.

4. The apparatus according to claim 1, wherein the rotor core feeding mechanism includes two conveyance tracks located at a rotor core inlet and a rotor core outlet, respectively, of the plastic dispensing mechanism.

5. The apparatus according to claim 4, wherein the control device is connected to the conveyance tracks through signals for the rotor cores to be sequentially fed to and removed from the plastic dispensing mechanism.

6. The apparatus according to claim 1, wherein the transfer plate is provided near the granule holding cavities with a plurality of heating elements.

7. The apparatus according to claim 1, further comprising an inserting and expanding device, which includes an outer sleeve, an inner sleeve, an insertion shaft, a powered pressing element and a powered restoring element;

the inner sleeve being in the form of an upward tapered cone, which is connected at its lower end to a plastic dispensing plate of the rotor core feeding mechanism;

the outer sleeve internally defining a conical space for fitting around the inner sleeve, and having its outer surface facing toward an inner surface of a shaft hole of the rotor core; the outer sleeve being provided with a plurality of upper slits that are axially downward extended from an upper end of the outer sleeve by a predetermined length, and a plurality of lower slits that are axially upward extended from a lower end of the outer sleeve by a predetermined length; the upper slits and the lower slits being circumferentially equally spaced and located in a staggered arrangement; and a receiving space and an anti-detachment section being formed atop the outer sleeve;

the insertion shaft including a head portion and a body portion; the body portion axially extending through the inner sleeve, the head portion being set in the receiving space, and the anti-detachment section being abutted against the head portion along the head portion's top edge; the receiving space and the anti-detachment section working together to restrict the insertion shaft from moving relative to the outer and the inner sleeve;

the powered pressing element being located in the vicinity of the head portion of the insertion shaft, and the powered restoring element being located in the vicinity of the lower end of the inner sleeve; and the powered pressing element and the powered restoring element being connected to the control device through signals, the control device controlling the powered pressing element to press against the head portion in an axial direction of the insertion shaft, so that the outer sleeve is subjected to a downward pressing force to become outward expanded; and the control device also being able to control the powered restoring element to upward press against the body portion in a reverse axial direction of the insertion shaft, so that the outer sleeve restores to its original position and shape.

8. The apparatus according to claim 1, wherein the rotor core feeding mechanism further includes a thermal insulation device, which includes an elevating arm, an insulation hood and a bottom heating plate; the elevating arm being connected to the insulation hood, and the bottom heating plate being located below the insulation hood; the control device being connected to the elevating arm through signals to control the elevating arm to move vertically.

9. The apparatus according to claim 1, wherein the rotor core feeding mechanism further includes an outer-diameter limiting device, which includes a movable arm and two half-circular retaining frames shaped corresponding to the rotor core; the movable arm being connected to the control device through signals for driving the two half-circular retaining frames to move onto a plastic dispensing plate of the rotor core feeding mechanism; and the two half-circular retaining frames respectively including a fastening section, which can be tightened to one another.

10. The apparatus according to claim 1, wherein the apparatus includes a plurality of parallelly arranged encapsulation units; the conveyance rail being common for use by all the encapsulation units, and the plastic granule feeding device and the waste removal zone being located at two outermost ends of the parallelly arranged encapsulation units.

* * * * *